(12) United States Patent
Gordon et al.

(10) Patent No.: US 6,243,717 B1
(45) Date of Patent: Jun. 5, 2001

(54) SYSTEM AND METHOD FOR IMPLEMENTING REVISION MANAGEMENT OF LINKED DATA ENTITIES AND USER DEPENDENT TERMINOLOGY

(75) Inventors: Brian Scott Gordon, San Jose; David Ralph Preston, Los Gatos; Lee Sean Henry, Campbell, all of CA (US)

(73) Assignee: Camstar Systems, Inc., Campbell, CA (US)

( * ) Notice: Subject to any disclaimer, the term of this patent is extended or adjusted under 35 U.S.C. 154(b) by 0 days.

(21) Appl. No.: 09/156,325

(22) Filed: Sep. 18, 1998

Related U.S. Application Data

(60) Provisional application No. 60/098,784, filed on Sep. 1, 1998.

(51) Int. Cl.[7] ..................................................... G06F 12/00
(52) U.S. Cl. ............................................ 707/203; 707/511
(58) Field of Search ..................................... 707/203, 202, 707/201, 200, 204, 205, 1, 2, 511

(56) References Cited

U.S. PATENT DOCUMENTS

| | | | | |
|---|---|---|---|---|
| 5,499,365 | * | 3/1996 | Anderson et al. | 395/600 |
| 5,734,899 | * | 3/1998 | Yoshizawa et al. | 707/203 |
| 5,806,078 | * | 9/1998 | Hug et al. | 707/511 |
| 5,819,295 | * | 10/1998 | Nakagawa et al. | 707/203 |
| 5,878,428 | * | 3/1999 | Copeland et al. | 707/103 |
| 5,890,176 | * | 3/1999 | Kish et al. | 707/511 |
| 5,897,636 | * | 4/1999 | Kaeser | 707/100 |
| 5,983,241 | * | 11/1999 | Hoshino | 707/203 |
| 6,014,676 | * | 1/2000 | McClain | 707/204 |

* cited by examiner

Primary Examiner—Thomas Black
Assistant Examiner—Mary D. Wang
(74) Attorney, Agent, or Firm—Wagner, Murabito & Hao LLP

(57) ABSTRACT

A system and method for implementing revision management of linked data entities and user dependent terminology. The present invention provides a novel method to implement revision management so that when a referenced data record is revised, no manual updating of any referencing data record is required to reflect the corresponding change. When defining a referencing data record, a user designates a choice of version of the referenced data record to be used with the referencing data record thereafter. Specifically, the user can either specify a particular version, in which case that particular version of the referenced data record will be used when the referencing data record is subsequently accessed, or the user can elect to use the "revision of record", in which case the version of the referenced data record currently identified as the "revision of record" will be used. The present invention also provides a method to implement user dependent terminology in a computer implemented system without requiring any user programming. Specifically, when a user logs in, the system determines the appropriate language and values of customizable terms for the user by checking the associated language and terminology set previously defined for the user. Thereafter, the system displays the custom value of the customizable term if it is defined within the terminology set associated with this user; otherwise, if it is defined within the language set associated with this user the system displays the corresponding representation of that customizable term in the user's chosen language; otherwise, the system displays the default value for the customizable term.

21 Claims, 14 Drawing Sheets

REVISIONS 45

| BASE_ID | INSTANCE_ID | REVISION | DETAILS |
|---|---|---|---|
| 709 | 1632 | A | - - - |
| 709 | 1631 | B | - - - |
| 709 | 1630 | C | - - - |
| ↑ 46 | ↑ 47 | ↑ 48 | ↑ 49 |

```
START
  ↓
STORE A FIRST VERSION OF A REVISIONABLE MODELING ENTITY
(RME)
310
  ↓
STORE A GENERAL MODELING ENTITY (GME) WHICH REFERENCES
THE RME AND SPECIFIES A CHOICE OF VERSION
320
  ↓
OPTIONALLY STORE A NEWER VERSION OF THE RME
330
  ↓
WAIT FOR A REQUEST TO RETRIEVE THE GME
340
  ↓
DYNAMICALLY RETRIEVE THE GME WITH THE PROPER VERSION
OF THE RME AS SPECIFIED IN STEP 320
350
  ↓
END
```

| USER_ID | LANGUAGE |
|---------|----------|
| 5 | DEFAULT |
| 7 | FRENCH |
| 10 | FRENCH |
| 15 | GERMAN |
| 20 | DEFAULT |
| * * * | * * * |

| USER_ID | TERMINOLOGY SET |
|---|---|
| 5 | DEFINED SET A |
| 7 | DEFINED SET B |
| 10 | DEFAULT SET |
| 15 | DEFINED SET A |
| 20 | DEFINED SET C |
| * * * | * * * |

SYSTEM AND METHOD FOR IMPLEMENTING REVISION MANAGEMENT OF LINKED DATA ENTITIES AND USER DEPENDENT TERMINOLOGY

The present application claims priority to the provisional application entitled "INSITE COMPUTER IMPLEMENTED SYSTEM" by Gordon, et al. (serial No. 60/098,784, attorney docket number CAMS-001.PRO) filed on Sep. 1, 1998 pursuant to 35 U.S.C. §119(e), 37 C.F.R. §1.78.

BACKGROUND OF THE INVENTION

1. Field of the Invention

The present invention relates to the field of computer implemented systems. More specifically, the present invention relates to techniques for managing revisionable data records and user dependent terminology within a computer implemented system.

2. Related Art

Modern computer implemented systems generally include functionalities by which data is stored, updated and accessed. In these computer implemented systems, data records are stored in a retrievable storage (e.g., a database residing in magnetic and/or optical media), and cross references or links among related data records are common. Typically, such cross references are stored in the retrievable media together with the associated data records. In the prior art, a user typically has to manually update all data records that reference a data record whenever the referenced data record is revised to ensure that any changes in the referenced data record are reflected accordingly in the referencing data record(s). Alternatively, the user has to specifically write a program or script to perform the same updating task. Numerous drawbacks exist for these prior art schemes. First, manual updating or additional programming as required in the prior art is error prone. For instance, if any referencing data record is not updated due to an omission or undetected programming error, the user is not alerted about the missing update and the integrity of the data is compromised. Furthermore, when an outdated referencing data record is itself referenced subsequently, it may even propagate the incorrect information with respect to the first referenced data record, thereby further degrading data integrity.

Furthermore, these prior art methods are time consuming and inefficient. For example, every time a change is made to a data record, the user must first determine whether any other data records are affected via cross referencing. If so, the user must then either manually perform the necessary updates to the affected data records or develop a dedicated program or script to perform the task. Such extensive manual steps involved in the actual updating of affected data records or developing a program to perform the same take up user time which can otherwise be devoted to more productive endeavors.

Yet another disadvantage of the prior art methods is that there exists an inevitable delay before a cross reference is actually updated. More specifically, when a data record is revised, those data records that reference it need to be updated accordingly. However, even if the user begins updating the referencing data records immediately after the referenced data record has been modified, there is still a possibility that the referencing record(s) are accessed prior to the corresponding update. Under such circumstances, an outdated reference results and data integrity is again compromised. As such, the overall reliability of the computer implemented system is adversely affected.

In addition, while modern computer implemented systems often support some user customizations, the level of support is usually limited and inflexible. For example, some prior art computer implemented systems provide an arbitrary selection of settings or configurations from which a user can choose to activate. However, the choices thus provided are generally limited and, more often than not, do not meet the distinct preferences and needs of a user. Often, the customizations are implemented using technical procedures that are not known to the end user, thereby requiring an expert to implement.

Other prior art off-the-shelf computer implemented systems allow users to override certain default configurations of the systems as shipped, but the users must programmatically develop the desired configurations to replace the default system configurations. Such additional development efforts not only incur extra costs to the user but also increase the time required to fully deploy the system.

Moreover, such program modules for user customizations are typically not supported by the system vendors because the modules are not considered standard components of the off-the-shelf systems. This translates into further additional costs and resources for supporting and maintaining the ongoing use of the customized systems.

Furthermore, a user with a customized system may not be able to take advantage of a later upgrade of the underlying off-the-shelf system released by the system vendor. This is because the customizing modules developed based on the older version of the off-the-shelf system may not be compatible with the newer version of the system. Under such circumstances, the user must either consume yet more resources to retrofit the customizing modules in order to upgrade to the new version of the underlying system and utilize any new features provided therein, or elect not to upgrade and thus be stuck with less desirable, antiquated technology.

Thus, there exists a need for a computer implemented system and method for data storage and retrieval wherein a referencing data record does not need to be manually updated when the corresponding referenced data record is revised. Further, there exists a need for a computer implemented system and method for data storage and retrieval wherein data integrity and system reliability are not compromised by outdated references arising from revisions of individual data records. In addition, there exists a need for a computer implemented system and method for data storage and retrieval which allows user customizations and does not restrict the customization to a few arbitrary choices. There also exists a need for a computer implemented system and method for data storage and retrieval that supports user customizations but does not impose costly development and maintenance expenditures upon the user and does not adversely affect the user's ability to migrate to improved versions of the system when they become available.

SUMMARY OF THE INVENTION

Accordingly, the present invention offers a system and method for data storage and retrieval wherein revision management of linked data entities are automated while ensuring system reliability and data integrity, and wherein flexible user dependent terminology is implemented without requiring programming. The present invention provides a novel method for implementing revision management so that when a referenced data record is revised, no manual updating of any referencing data record is required to reflect the corresponding change. When defining a referencing data record, a user designates a choice of version of the referenced data record to be used with the referencing data record thereafter. Specifically, in one embodiment, the user can either specify a particular version number, in which case that particular version number of the referenced data record will be used when the referencing data record is subsequently accessed, or the user can elect to use the "revision of record", in which case a predefined version (e.g., the most current version) of the referenced data record will be used.

Moreover, the present invention also provides a method for implementing user dependent terminology in a computer implemented system without requiring any user programming. Specifically, in one embodiment, when a user logs in to the computer system, the computer system determines the appropriate language and values of customizable terms for the user by checking the associated language and terminology set previously defined for the user. The selection is therefore based on the user identification and is very transparent to the user. Thereafter, the computer system displays the custom value of the customizable term if it is defined within the terminology set associated with this user; otherwise, the system displays the corresponding representation of that customizable term in the user's chosen language. Lastly, if none of the above are defined, a default language set is used.

Thus, by providing a user-driven yet fully automated method for revision management of linked data records, the present invention eliminates the need of the prior art for manual updates of referencing data records when the corresponding referenced data record is revised. Further, data integrity and system reliability are dramatically enhanced by preventing errors arising from manual updates and by enabling instantaneous, automatic update of referenced data records by virtue of the "revision of record" designation. In addition, the user transparent and flexible customization capabilities afforded by the present invention while imposing no programming overhead greatly improves the usability and versatility of customizable systems. These and other advantages of the present invention not specifically described above will become clear within discussions of the present invention herein.

BRIEF DESCRIPTION OF THE DRAWINGS

The accompanying drawings, which are incorporated in and form a part of this specification, illustrate embodiments of the present invention and, together with the description, serve to explain the principles of the invention.

FIGS. 4A and 4B are logical diagrams illustrating the data structures used to represent an exemplary RME in accordance with the present invention.

FIG. 5 is a flow diagram illustrating steps of a computer system implemented process for realizing the novel method of revision management in accordance with the present invention.

FIGS. 8A and 8B are exemplary tables illustrating the data structures used to implement user dependent terminology in accordance with one embodiment of the present invention.

DETAILED DESCRIPTION OF THE INVENTION

Figure 1:
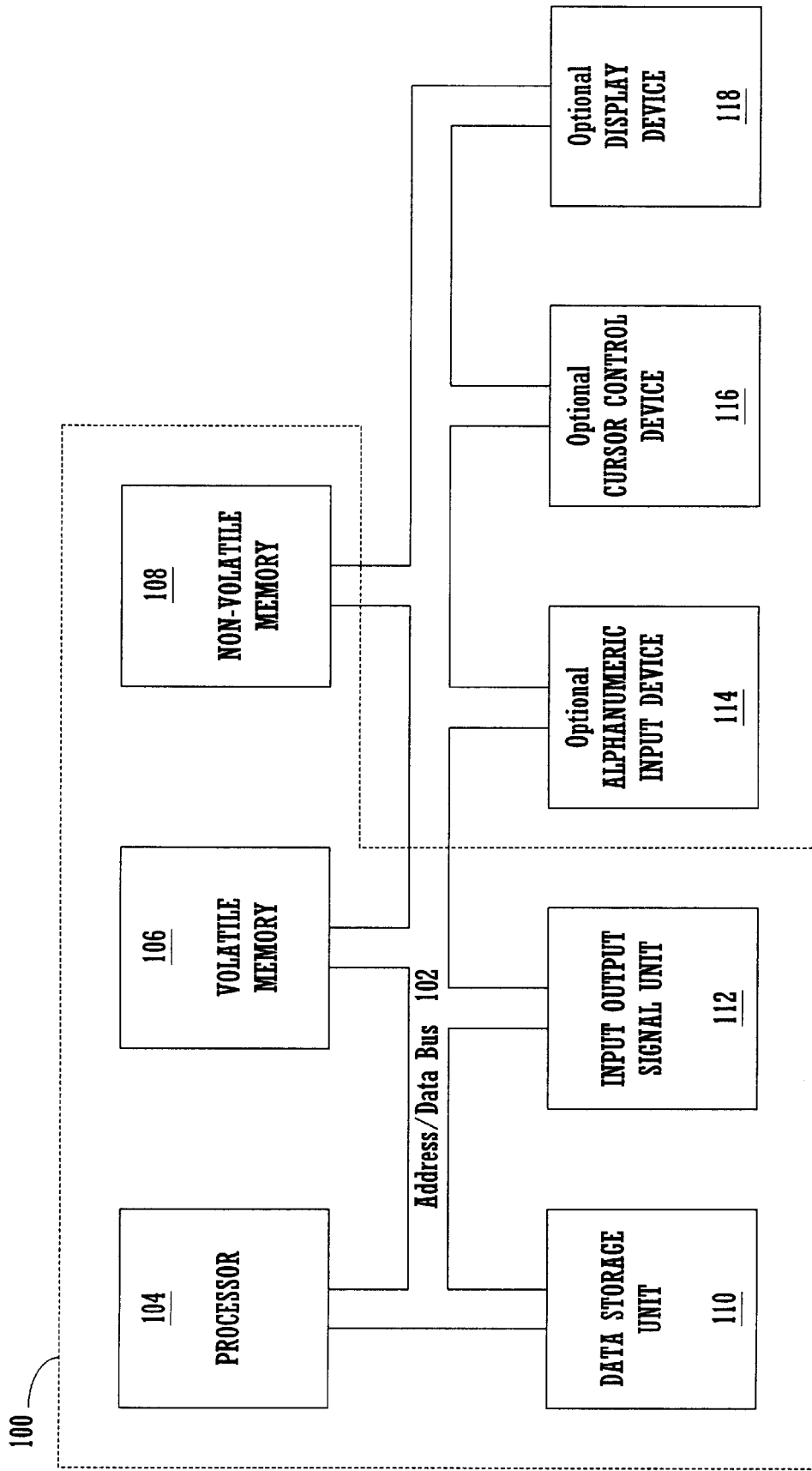
FIG. 1 is a general purpose computer system which provides an operational platform for embodiments of the present invention.

In the following detailed description of the present invention, a system and method for implementing revision management of linked data entities and user dependent terminology, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

NOTATION AND NOMENCLATURE

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing", "appointing", "generating", "receiving", "linking" or the like, refer to the action and processes of a computer system (e.g., FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Aspects of the present invention, described below, are discussed in terms of steps executed on a computer system. These steps (e.g., processes 300, 350 and 500) are implemented as program code stored in computer readable memory units of a computer system and are executed by the processor of the computer system. Although a variety of different computer systems can be used with the present invention, an exemplary general purpose computer system 100 is shown in FIG. 1.

COMPUTER SYSTEM ENVIRONMENT

In general, computer system 100 includes an address/data bus 102 for communicating information, a central processor 104 coupled with the bus for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 100 also includes a data storage device 110 ("disk subsystem") such as a magnetic or optical disk and disk drive coupled with the bus 102 for storing information and instructions. Data storage device 110 can include one or more removable magnetic or optical storage media (e.g., diskettes, tapes) which are computer readable memories. Memory units of system 100 include 106, 108 and 110. Computer system 100 can also include a signal input output communication device 112 (e.g., modem, network interface card NIC) coupled to the bus 102 for interfacing with other computer systems.

Also included in computer system 100 of FIG. 1 is an optional alphanumeric input device 114 including alphanumeric and function keys coupled to the bus 102 for communicating information and command selections to the central processor 104. Computer system 100 also includes an optional cursor control or directing device 116 coupled to the bus 102 for communicating user input information and command selections to the central processor 104. An optional display device 118 can also be coupled to the bus 102 for displaying information to the computer user. Display device 118 may be a liquid crystal device, other flat panel display, cathode ray tube, or other display device suitable for creating graphic images and alphanumeric characters recognizable to the user. Cursor control device 116 allows the computer user to dynamically signal the two dimensional movement of a visible symbol (cursor) on a display screen of display device 118. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 2:
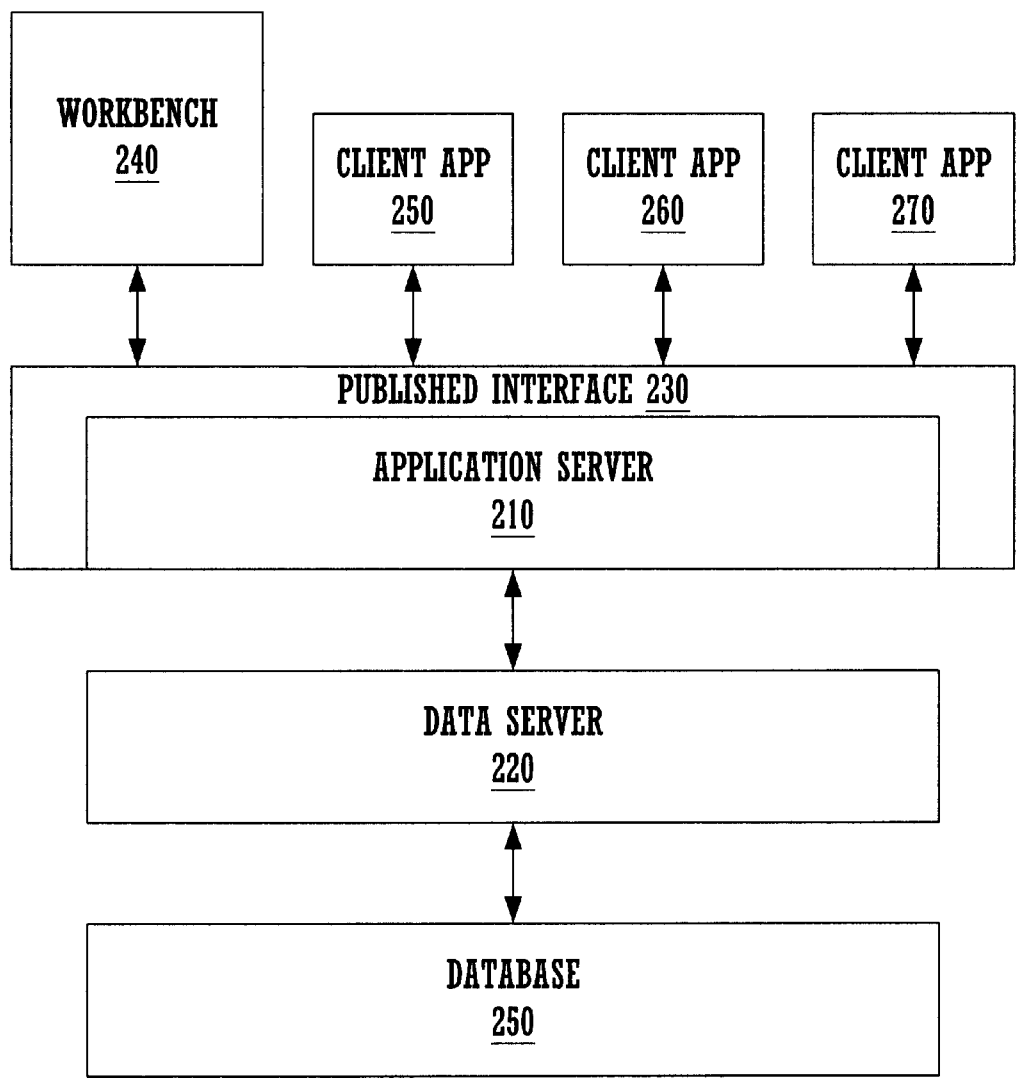
FIG. 2 is a high level block diagram of an exemplary configuration of the computer implemented system in accordance with the present invention.

FIG. 2 is a high level block diagram of an exemplary configuration of the computer implemented system in accordance with the present invention. One embodiment of the computer implemented system of the present invention is a Manufacturing Execution System (MES) for integrating and managing information from the factory floor and for providing production management capabilities and factory automation solutions. Specifically, in one embodiment, system 200 includes application server 210, which encapsulates business rules and application logic as data objects and access methods, thus enabling flexible and powerful modeling of manufacturing data and processes. In a preferred embodiment, the novel method of revision management of the present invention is implemented within data server 220 and exposed through application server 210. In one embodiment, multiple application servers can be maintained within system 200 to provide for additional scalability of the system.

System 200 also includes data server 220 and database 250. Data server 220 is responsible for managing the translation of data from objects (e.g., modeling entities such as configurable data objects (CDOs)) in application server 210 to the proper database format for storage in database 250, and vice versa. Thus, data is retrieved from and stored to database 250, with the appropriate translation, via data server 220. In one embodiment, database 250 is a relational database management system (RDBMS), thereby allowing the use of industry standard tools for data access. Examples of commercially available RDBMS's include SQL Server V6.5+ for Windows NT by Microsoft Corporation and Oracle 7.3+ for Windows NT or UNIX by Oracle Corporation. In one embodiment, communications between data server 220 and database 250 are supported via open database connectivity (ODBC), thus enabling full database independence.

With reference still to FIG. 2, in one embodiment, system 200 further includes workbench 240 and client applications 250, 260 and 270. Workbench 240 provides a collection of user applications to facilitate object and model definitions, user and security management, and also database configurations. Client applications 250, 260 and 270 are application extensions that enhance and/or customize the functionalities of system 200 and may include third party off-the-shelf applications, user developed custom applications, additional user interfaces, and the like. It is appreciated that client applications 250, 260 and 270 are entirely optional to system 200. Users of system 200 can implement more or fewer client applications based on their own needs within the scope of the present invention.

Still referring to FIG. 2, in one embodiment, application server 210 communicates with data server 220 via named pipes. In particular, using named pipes provides for scalability of system 200 by delivering data from multiple applications running on one or more application servers. On the other hand, application server 210 communicates with workbench 240 and client applications 250, 260 and 270 through published interface 230. Published interface 230 is a consistent, public interface which serves as a bridge between application server 210 and client applications 250, 260 and 270 and also workbench 240. In one embodiment, published interface 230 is built upon Microsoft's COM/DCOM and ActiveX technologies. As such, users of system 200 can easily customize and/or extend the functionalities of the system by adding application extensions, such as client applications 250, 260 and 270, which are compliant with these industry standard technologies. Through published interface 230, users can even integrate system 200 with other computer implemented systems, such as enterprise resource planning (ERP) systems, to provide a seamless enterprise computing environment.

REVISION MANAGEMENT

Within a computer implemented system in accordance with the present invention, certain data records are used to model objects in the system. As such, these data records are referred to as general modeling entities (GMEs). Because certain objects are subject to revision, multiple versions of such revisionable objects can thus exist concurrently in the system. Accordingly, in order to provide realistic modeling capabilities in the system, a subset of GMEs are capable of maintaining multiple versions of their respective objects in the system and are called revisionable modeling entities (RMEs).

Figure 3:
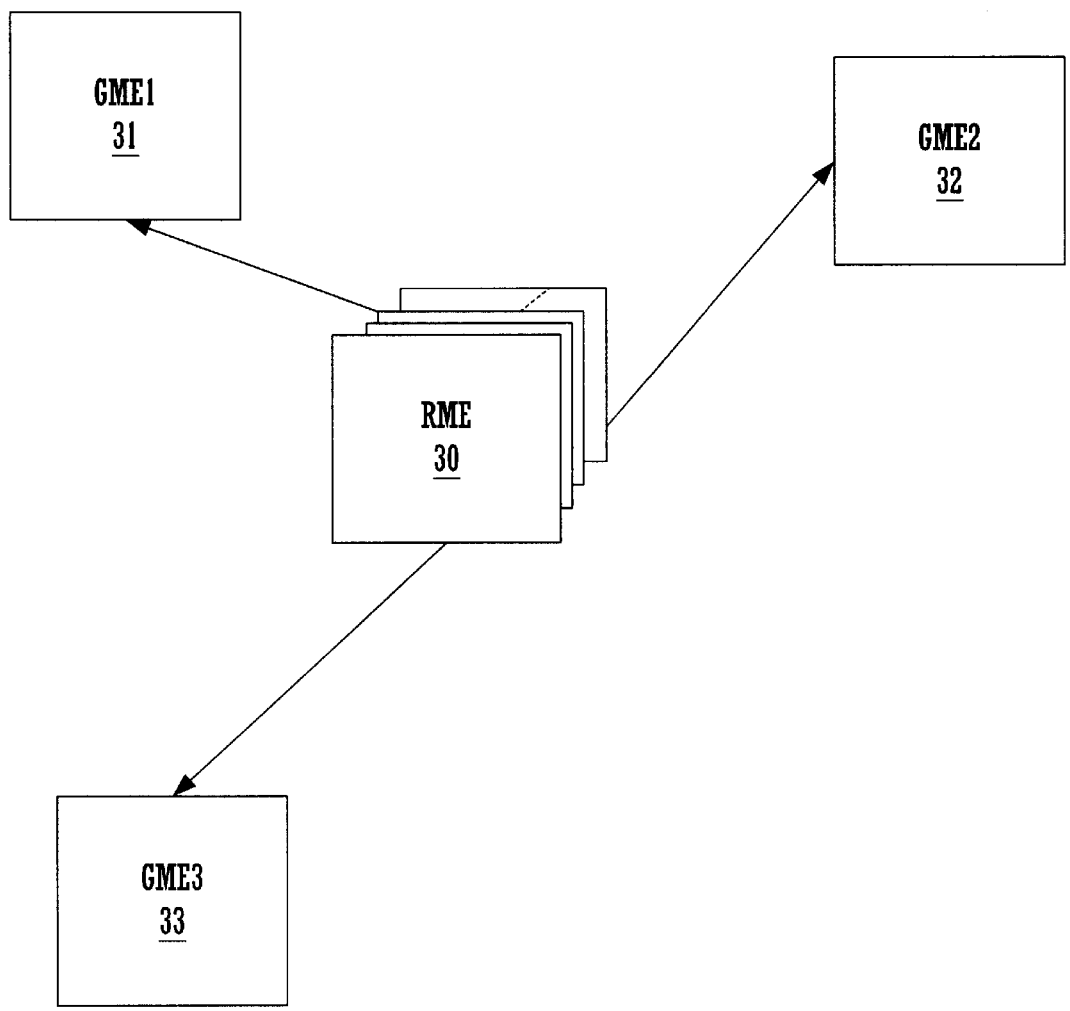
FIG. 3 is a high level diagram illustrating the relationship between an RME and several referencing GMEs in accordance with the present invention.

Referring to FIG. 3, a high level diagram illustrating the relationship between an RME and several referencing GMEs in accordance with the present invention is shown. In FIG. 3, RME 30 is referenced by three different GMEs, namely: GME1 31, GME2 32 and GME3 33. Under this referencing relationship, each of the three GMEs receives input from the information defined within RME 30, and such input in turn forms part of the information defined in each of the GMEs. Nevertheless, since RME 30 can have multiple versions existing concurrently, GME1 31, GME2 32 and GME3 33 may receive their respective inputs from different versions of RME 30. As described in further detail below, the user can specify for each of the GMEs which version of RME 30 to link to when the GMEs are later accessed.

In an exemplary Manufacturing Execution System, examples of RMEs include product definitions, setups, process specifications, work instructions, workflows, etc. On the other hand, examples of GMEs include alarm definitions, customers, enterprises, event definitions, factories, manufacturing orders, notification targets, operations, product families, resource (machine) definitions, sales orders, text variables, user codes, work centers, work schedules, workflow steps, etc. As described above, RMEs are a particular subset of GMEs characterized by their revisionable capability. It is thus appreciated that certain object types, such as product definitions, can either be GMEs or RMEs depending on the particular situation. For example, a product definition acts as a GME when it references a manufacturing workflow, but when a reference is made to a product definition, the product definition acts as an RME with respect to the referencing entity. Additional examples of GMEs referencing RMEs include: a product family referencing a workflow, a resource (machine) definition referencing a setup, and a workflow step referencing a process specification. Moreover, an RME can also reference another RME, for example, a product definition can reference a workflow, a setup can reference a work instruction, and a process specification can reference a setup.

The present invention provides a novel method to implement revision management so that when an RME is revised, no manual updating of any referencing GME is required to reflect the corresponding change. In particular, when defining a GME which references or links to an RME, a user designates a choice of version of the RME to be used with the GME thereafter. Specifically, the user can either specify a particular version, in which case that particular version of the RME will be used when the referencing GME is subsequently accessed, or the user can elect to use the "revision of record", in which case the version of the RME designated as the "revision of record" (e.g., the most current version) will be used when the GME is later accessed.

Within the scope of the present invention, although it is common to designate the most current version of an RME to be its "revision of record", it is not necessarily always the case. A particular version of an RME can be appointed or designated as the "revision of record" even though that version is not the most current version of the RME. The ability to make such an appointment or designation is useful when the latest version of the RME in question is still being tested or is designed for a limited purpose. Under such circumstances, the user can appoint another appropriate version of the RME to be the "revision of record" and restrict access to the latest test version of the RME by specific designation. Importantly, all GMEs that specify the "revision of record" of the RME will link to the specially appointed version and not the most current version of the RME in this situation. As such, a controlled testing or limited deployment environment can be maintained without affecting the integrity of GMEs that reference the RME in question.

As an example, if a modeling entity of a product definition is defined to use (e.g., linked to) the revision of record of a workflow and the workflow is subsequently revised, the product will automatically refer to the most current version of the workflow (identified as the revision of record) without requiring an update of the product definition or to the referencing GME. Stated differently, the revision of record (e.g., the most current version) of the referenced workflow is dynamically identified and selected every time the product definition is being accessed, thus obviating the need to modify the product definition whenever the referenced workflow is changed. In contrast, if a product definition is defined to use a particular version of a workflow, and therefore not the revision of record, the product definition will always refer to that particular version of the workflow irrespective of whether the workflow has been subsequently revised or not or if the revision of record is modified. Unless the user desires to change the version designation, the product definition needs not be modified.

Figure 4A:
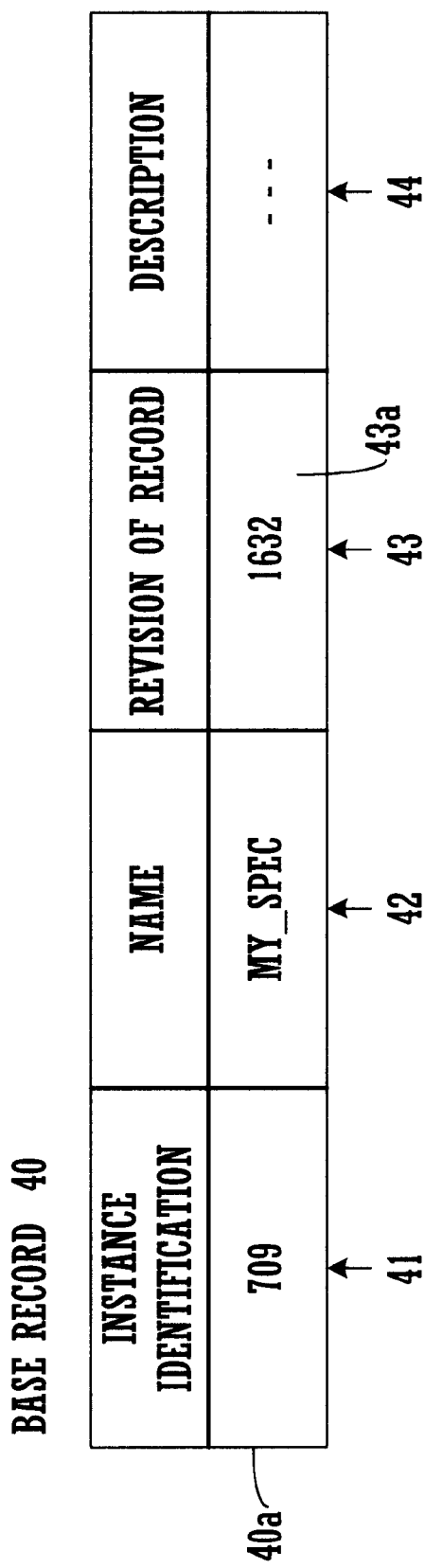

FIGS. 4A and 4B are logical diagrams illustrating the data structures (stored in computer readable memories of system 100) used to represent an exemplary RME in accordance with the present invention. The exemplary RME is represented by a single row 40a in base record table 40 (FIG. 4A) and multiple rows 45a, 45b and 45c in revisions table 45 (FIG. 4B) which is also memory stored.

Referring to FIG. 4A, there are several columns in base record table 40. Instance ID column 41 stores the unique ID of the RME (e.g., 709). Name column 42 stores the text string representing the name of the RME (e.g., MY_SPEC). Revision of record column 43 stores the unique ID of the revision which is currently designated as the RME's "revision of record" (e.g., 1632) in accordance with the present invention. Description column 44 stores the instant RME's textual description, if any.

Referring to FIG. 4B, there are several columns in revisions table 45. Base ID column 46 stores the unique ID of the RME (e.g., 709). Instance ID column 47 stores the unique IDs of the various revisions of the RME (e.g., 1632, 1631, 1630). Revision column 48 stores the names of the various revisions of the RME (e.g., A, B, C). Details column 49 stores the textual description of the various revisions, if any.

Referring to both FIGS. 4A and 4B, the exemplary RME called "MY_SPEC" and represented by the unique ID '709' has three revisions, namely: 'A', 'B' and 'C', represented respectively by unique IDs '1632', '1631' and '1630'. In particular, the revision of record for this RME is revision 'A' having ID '1632', as indicated by the match of the IDs in revision of record column 43 in base record table 40 and in instance ID column 47 in revisions table 45. The data structures used to implement RMEs in accordance with the present invention are thus described. To change the revision of record for this RME, the present invention changes the description of cell 43a. This would automatically change the revision of record for all GMEs that are linked to the revision of record for this RME, without requiring any program modifications to these GMEs.

FIG. 5 is a flow diagram illustrating steps of a computer system implemented process 300 for realizing the method of revision management in accordance with the present invention. In step 310, process 300 stores a new version of an RME into a data storage medium. This new version can either be the initial version of the RME or a revision of an earlier version. If it is not the initial version, this new version is added to the storage while all existing prior versions are maintained. After storage, the data structure as shown in FIG. 4B would be updated to reflect the new revision version.

Then, in step 320, process 300 stores a GME which references the RME described in step 310 into the data storage medium. In particular, a choice of version of the RME is specified by the user and stored as part of the GME. This choice of version will be used to determine which version of the RME to reference in subsequent retrievals of the GME. In accordance with the present invention, the user can either stipulate a particular version of the RME or specify that the "revision of record" of the RME is to be used.

Figure 6:
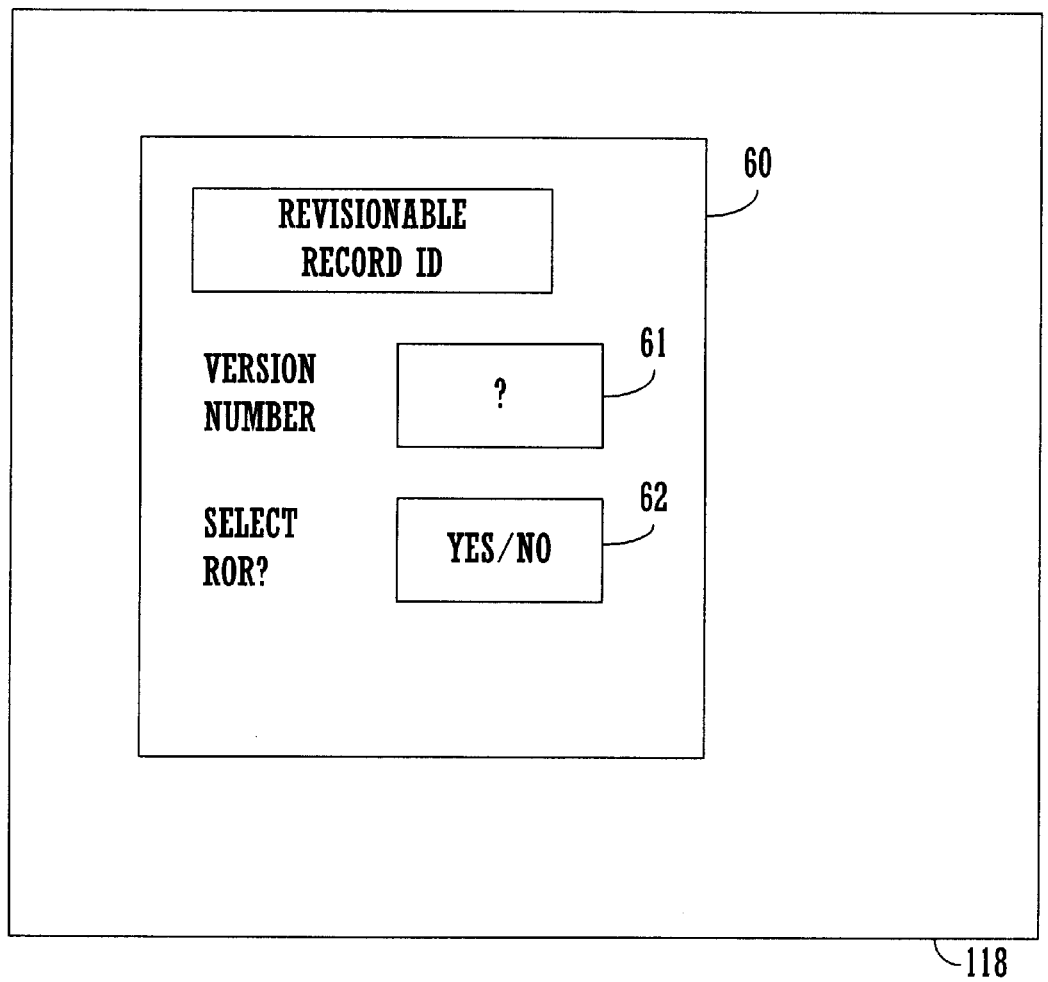
FIG. 6 is a diagram illustrating an exemplary graphical user interface for user designation of a choice of version of the RME referenced in a GME in accordance with one embodiment of the present invention.

FIG. 6 is a diagram illustrating an exemplary graphical user interface (GUI) for user designation of a choice of version of the RME referenced in a GME in accordance with one embodiment of the present invention. In one embodiment of the present invention, two data fields 61 and 62 are presented to the user within a GUI 60 on display device 118 when a GME is being created or modified. Field 61 allows the user to specify a particular version number of the referenced RME. Field 62 is an indicator representing the choice "revision of record" of the RME and can be either selected or unselected. In one embodiment, version number field 61 is disabled (thus preventing the user from entering a value therein) when "revision of record" indicator field 62 is selected. In another embodiment, the value entered into version number field 61 is ignored when "revision of record" indicator field 62 is selected. In both embodiments, version number field 61 is effective for stipulating a particular version of the RME only when "revision of record" field 62 remains unselected. In a second embodiment, fields 61 and 62 can be merged into a single field having multiple functionalities.

Referring back to FIG. 5, in optional step 330, process 300 stores another version of the RME described in step 310 into the data storage medium. This latest version is added to the storage and stored concurrently with earlier versions of the RME. Again, the data structures in FIG. 4B are updated.

Next, in step 340 of FIG. 5, process 300 waits for a request to retrieve or access the GME described in step 320. In step 340, if not already selected, the user appoints a particular version of the RME to be the revision of record. This involves updating cell 43a of the data structure shown in FIG. 4A.

With reference still to FIG. 5, upon receiving the retrieval request in step 340, process 300 proceeds to step 350, in which process 300 dynamically retrieves the requested GME, with the portion of information pertinent to the referenced RME being obtained from the version of the RME as specified by the choice of version entered in step 320 above. Process 300 then terminates. Step 350 is described in further detail below with reference to FIG. 7.

Figure 7:
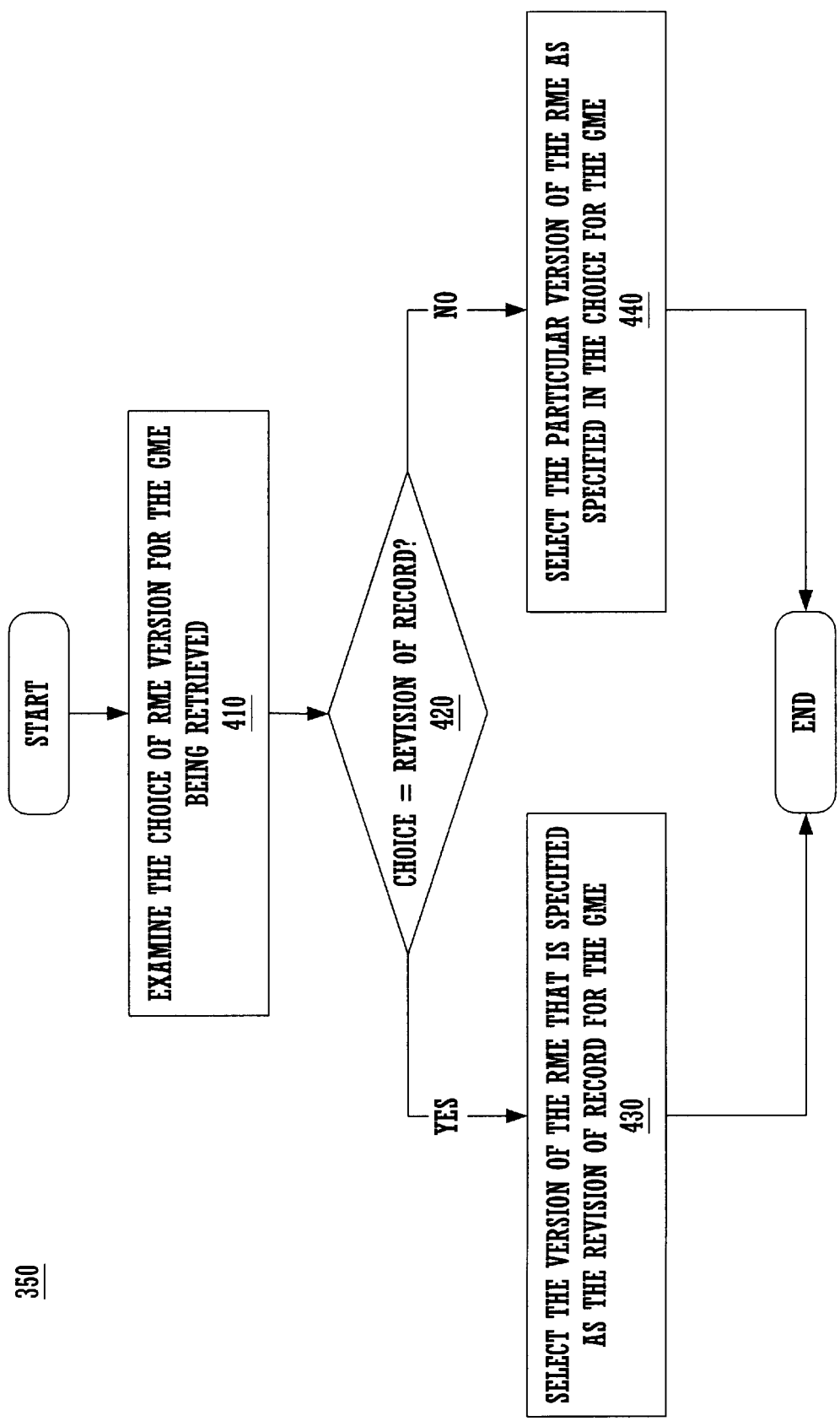
FIG. 7 is a flow diagram illustrating steps of a computer system implemented process for dynamically determining the proper version of a RME to use when a referencing GME is being retrieved in accordance with the present invention.

FIG. 7 is a flow diagram illustrating steps of a computer system implemented process 350 for dynamically determining the proper version of a RME to use when a referencing GME is being retrieved in accordance with the present invention. In step 410, process 350 examines the choice of version of RME for the GME being retrieved. In accordance with the present invention, the choice has been specified by the user when the GME was created or last modified.

Next, in step 420, process 350 determines whether the choice of version for the GME in question is specified to be the "revision of record". If so, process 350 proceeds to step 430 in which the version of the RME that is indicated by cell 43a of the data structure of FIG. 4A is selected in conjunction with the requested GME. Typically this is the most current version of the RME, and in the example of FIG. 4A and FIG. 4B it is revision 'A'. Process 350 then terminates. On the other hand, if it is determined in step 420 that the choice of version is not "revision of record", then in accordance with the present invention a particular version of the RME must have been specified by the user. Thus, in this case, process 350 proceeds instead to step 440 in which the particular version of the RME is selected in conjunction with the requested GME. In the above example, this could be either revision 'B' or revision 'C', but could also be revision 'A' as specifically referenced. Process 350 then terminates.

In accordance with the present invention, once the "revision of record" designation of a RME has been changed, all GMEs that reference the revision of record of the RME will automatically link to the newly appointed version without any user involvement. Moreover, the built-in "revision of record" referencing affords instantaneous reflection of any changes to the revision of record of an RME in the referencing GMEs, thus further enhancing system reliability and data integrity of the computer system in accordance with the present invention, since the possibility of a referencing GME linking to an outdated version of a referenced RME, which is inherent in the prior art, has been completely eliminated in the present invention.

Thus, by eliminating the need for any manual update of referencing GMEs, the present invention provides a highly efficient and reliable method for implementing revision management. In particular, errors arising from manually or programmatically entered updates are completely eliminated and data integrity will not be compromised due to such errors.

USER DEPENDENT TERMINOLOGY

The present invention provides a novel method to implement user dependent terminology in a computer implemented system that is user transparent, e.g., without requiring any user programming. The method is highly flexible because it allows a user to custom define the values for a wide range of customizable terms and save these terms in a terminology set to be used for display with that user. A default terminology set is provided with the system in accordance with the present invention. Thus, customization is a choice rather than a requirement and a user can always rely on the default terminology set provided the user so chooses. In one embodiment, the default terminology set represents the American standard for industrial terms. A user can also designate a language other than the default language, which in one embodiment is English, to be the preferred language for display in the system. In an exemplary Manufacturing Execution System, examples of terminology that can be customized include, among others, country specific labels for industrial terms and industry specific labels for manufacturing terms.

Specifically, the novel method provides that each user identification (user ID) within the system is associated with a language and a terminology set. When a user logs in using the assigned user ID, the system checks the associated language and terminology set of the user ID and determines the appropriate language and values of customizable terms for this particular user. Then, whenever a customizable term needs to be displayed while the user remains logged in, the system displays the custom value of the customizable term if it is defined within the terminology set associated with this user; otherwise, the system displays the corresponding representation of that customizable term in the user's chosen language or, lastly, in a default language as the case may be. Other information displayed to the user is also displayed with the user's selected language.

FIGS. 8A and 8B are exemplary tables illustrating the data structures used to implement user dependent terminology in accordance with one embodiment of the present invention. The associated language of a user is stored in one of rows 81a, 81b, 81c, 81d and 81e in language table 80 (FIG. 8A), while the associated terminology set of a user is stored in one of rows 87a, 87b, 87c, 87d and 87e in terminology set table 85 (FIG. 8B).

Referring to FIG. 8A, user ID column 82 stores the unique IDs of the users (e.g., 5, 7, 10, 15, 20). Language column 83 stores the text strings representing the languages of choice of the users (e.g., French, German). If a language is not specified for a user, 'default' is entered in language column 83 for the user. This represents a predetermined default language (e.g., English).

Referring to FIG. 8B, user ID column 86 again stores the unique IDs of the users (e.g., 5, 7, 10, 15, 20). Terminology set column 88 stores the text strings representing the designated terminology sets of the users (e.g., defined set A, defined set B). If a terminology set is not specified for a user, 'default set' is entered in terminology set column 88 for the user. It is appreciated that the default terminology set can represent a null set.

As an example, referring to both FIGS. 8A and 8B, the user represented by the unique user ID '5' (row 81 a in language table 80 and row 87a in terminology set table 85) has no designated language and thus uses the default language as provided by the system. On the other hand, the same user has "defined set A" as the terminology set of choice. Thus, when a customizable term is to be displayed for the user having user ID '5', the system first searches in "defined set A" to try to locate a definition for the customizable term. If it is found, it is displayed accordingly. However, if this search in "defined set A" fails, then the system displays the corresponding representation of the term in the default language, since that is the user's associated language. Alternatively, if the designated language specified by the user was not the default language, and nevertheless the term was not defined in the designated language, then the default language would be used as a last resort. The data structures used to implement user dependent terminology in accordance with the present invention are thus described.

Figure 9:
FIG. 9 is an exemplary logical illustration showing a graphical user interface for defining labels within a terminology set and the default terminology set in accordance with the present invention.

FIG. 9 is an exemplary logical illustration showing a graphical user interface (GUI) for defining labels within a terminology set and the default terminology set in accordance with the present invention. As shown in FIG. 9, GUI 90 includes various data fields to allow a user to view, create or edit a label. In particular, Labelid column 92 contains the unique codes or string IDs of the existing labels, Text column 94 contains the custom definitions for the labels within a particular terminology set, and Name column 96 contains the default definitions for the labels within the default terminology set. Column 92 represents the customizable terms. For example, row 97 represents the label with the unique code '0010-000F' having a default definition of "ThuReportingLevel" and a custom definition of "Throughput Reporting Level:". Thus, at run time, a user associated with this terminology set will see the custom definition "Throughput Reporting Level:" displayed for this particular term with code '0010-000F' since it is defined within the terminology set.

Figure 10:
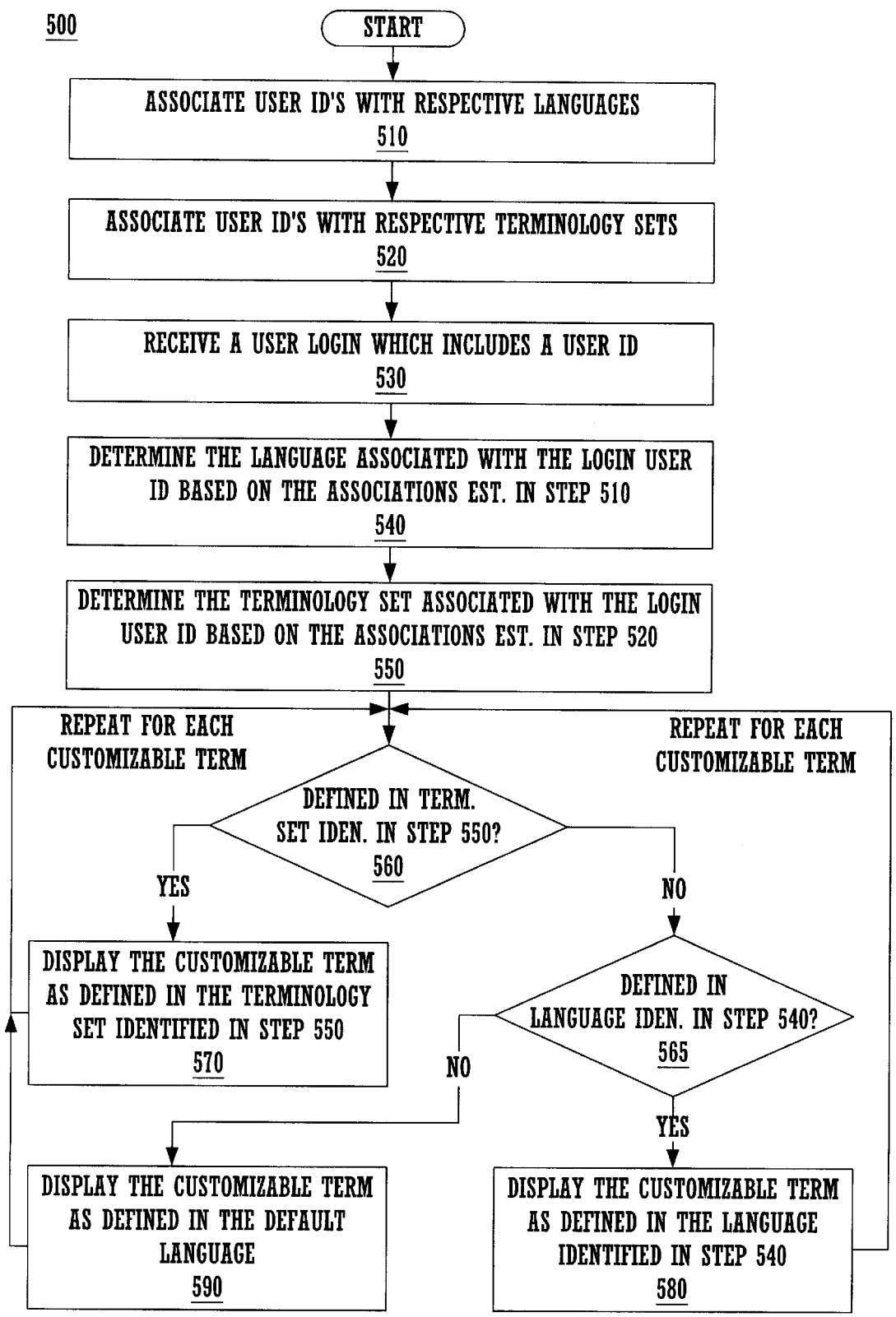
FIG. 10 is a flow diagram illustrating steps of a computer system implemented process for implementing user dependent terminology in accordance with the present invention.

FIG. 10 is a flow diagram illustrating steps of a computer system implemented process 500 for implementing user dependent terminology in accordance with the present invention. In step 510, process 500 associates the user IDs within the system with their respective languages. User IDs of those users who do not specify a language are implicitly associated with the default language.

In step 520, process 500 associates the user IDs within the system with their respective terminology sets. User IDs of those users who do not specify a terminology set are implicitly associated with the default terminology set.

Referring still to FIG. 10, in step 530, process 500 receives a user login which identifies the current user by the user ID supplied at the login.

Then, in response to step 530, in step 540, process 500 determines the language preference of the current user by checking the associated language for the current user ID.

Also in response to step 530, in step 550, process 500 determines the values of customizable terms for this particular user by checking the associated terminology set for the current user ID.

With reference still to FIG. 10, in step 560, while the current user remains logged in, process 500 determines whether a customizable term that needs to be displayed is defined in the terminology set associated with the current user. If so, process 500 proceeds to step 570 in which the custom value of the customizable term is displayed as it is defined in the associated terminology set; otherwise, process 500 proceeds to step 565 in which it is determined whether the customizable term is defined in the language associated with the current user.

Stilling referring to FIG. 10, if it is determined in step 565 that the customizable term is defined in the user's designated language, process 500 proceeds to step 580 in which the string in the user's designated language that corresponds to that customizable term is displayed. However, if it is determined in step 565 that the customizable term is not defined in the user's designated language, process 500 proceeds instead to step 590 in which the string in the default language that corresponds to that customizable term is displayed. More particularly, in step 570, a code or string ID is checked to see if it is defined within the selected terminology set. If so, the defined string is displayed; if not, the code or string ID is checked again to see if it is defined within the selected language. If so, the string is selected from the selected language and displayed in step 580; if not, the default string is selected from the default language and displayed in step 590.

Upon the completion of step 570, step 580 or step 590, process 500 returns to step 560 as long as the current user remains logged in. Step 560, and the appropriate steps among step 565 through step 590, are repeated for each customizable term that needs to be displayed. When the current user logs out of the system, process 500 terminates.

Figure 11A:
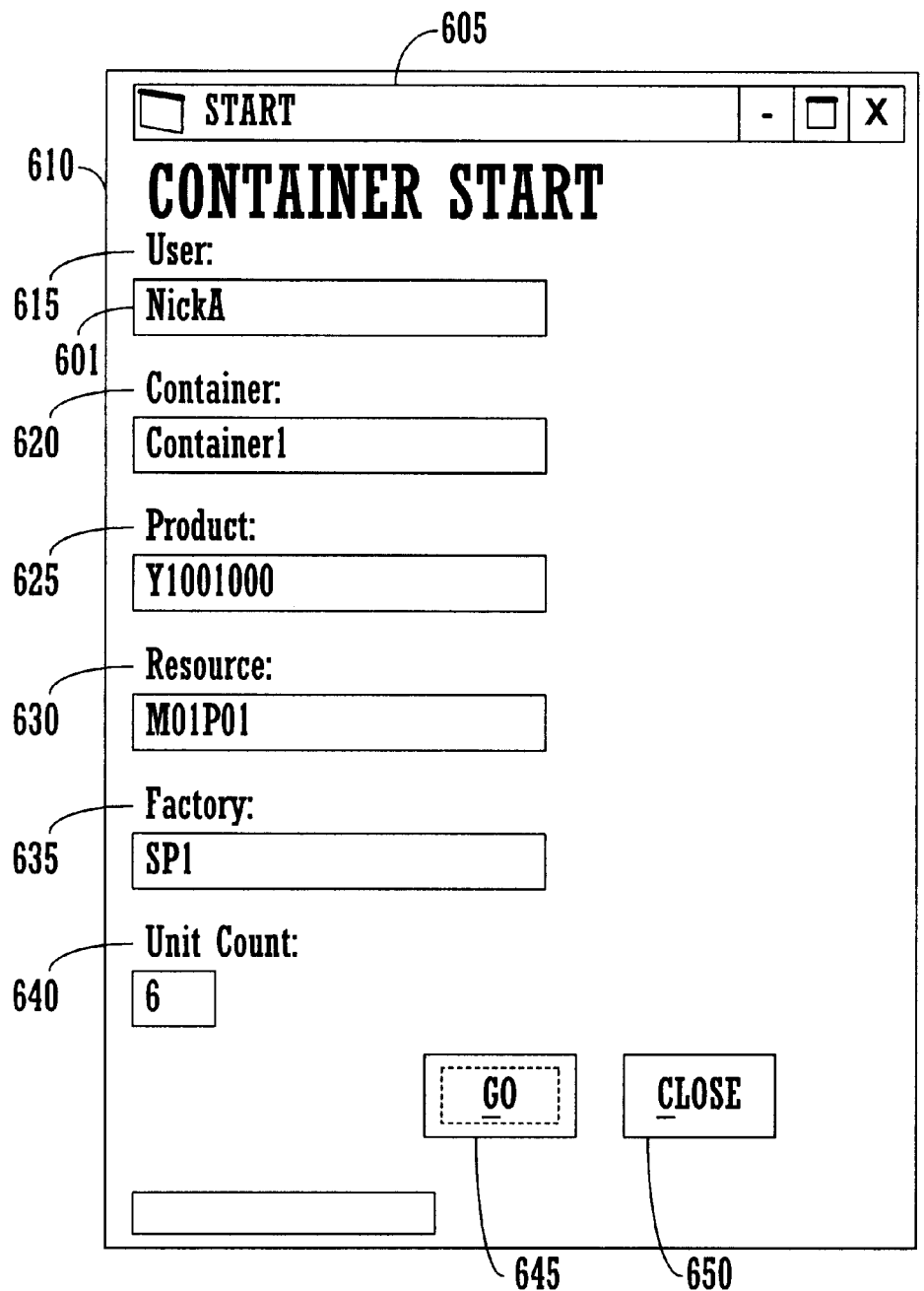
FIGS. 11A and 11B are exemplary graphical user interfaces with labels in different languages as a result of different login user IDs in accordance with the present invention.
Figure 11B:
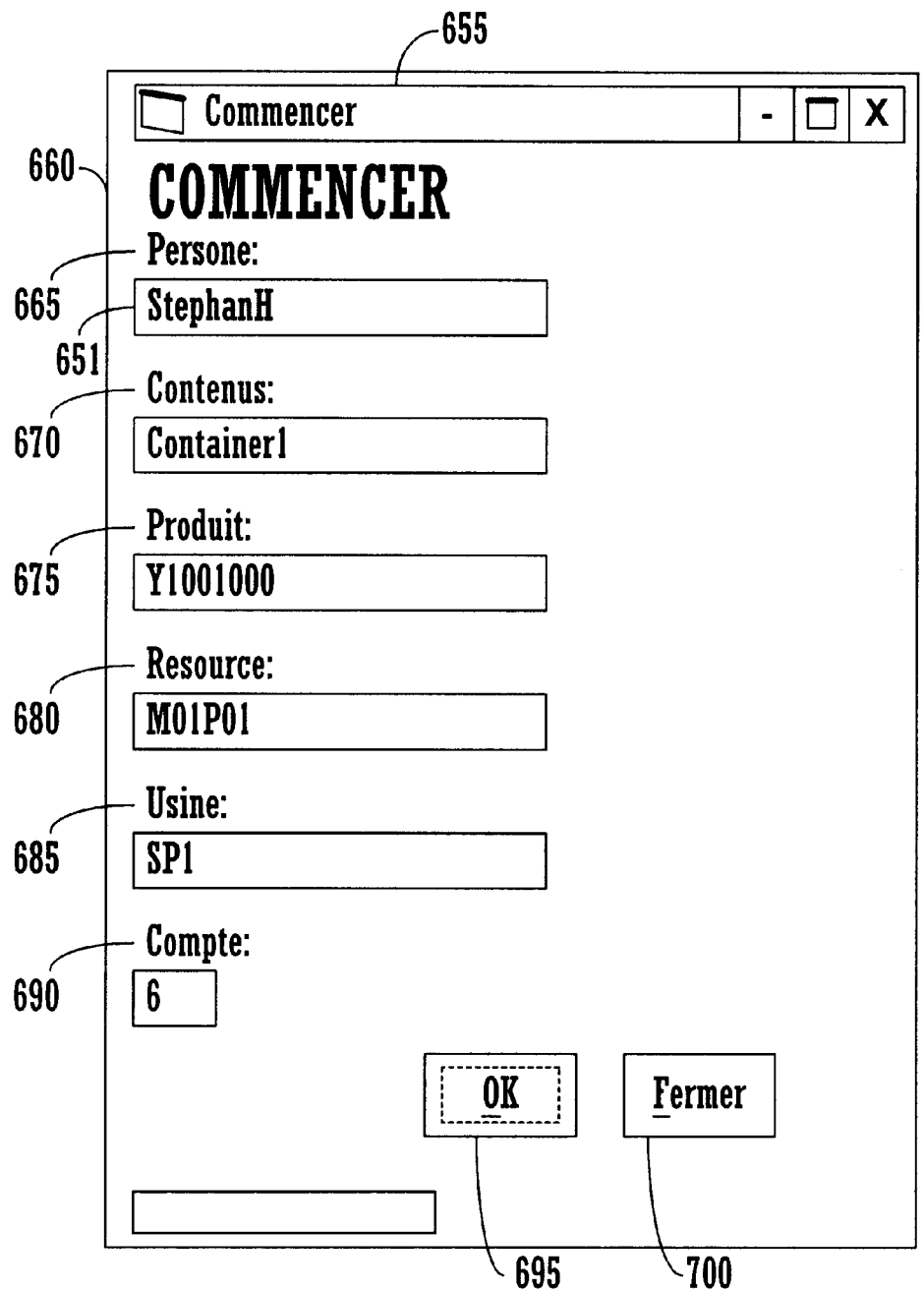

FIGS. 11A and 11B are exemplary graphical user interfaces with labels in different languages as a result of different login user IDs. In FIG. 11A, user NickA 601 has specified English as his language of choice. Thus, the text in title bar 605, the dialog box label 610, the various field labels 615, 620, 625, 630, 635 and 640 and also the text on the push buttons 645 and 650 are all displayed in English. In contrast, in FIG. 11B, user StephanH 651 has specified French as his language of choice. So, the text in title bar 655, the dialog box label 660, the various field labels 665, 670, 675, 680, 685 and 690 and also the text on the push buttons 695 and 700 are all displayed in French. FIGS. 11A and 11B serve to visually depict the user dependent views seen by users with different terminology set and/or language settings. Importantly, the change in view is transparent to the user because the proper view is automatically determined by the system when the user logs in based on the user's associated language and terminology set, and the customizable terms will be displayed accordingly. As such, no user action is necessary to ensure that the designated language or terminology set is used.

Thus, by allowing users to freely customize the values for a wide array of terminology used in the system through terminology sets, the method of the present invention provides a highly flexible and easy to use customizable system which are free of the costly and time consuming development and maintenance requirements typical of the prior art which requires the user to make programmatic changes to effectuate any customization. As a built-in capability of the system, the method of the present invention is not only fully supported by the system vendor but also poses no compatibility problem with respect to future upgrades of the system. As such, the method of the present invention affords a novel and superior solution to implementing customizable systems.

The preferred embodiment of the present invention, a system and method for implementing revision management of linked data entities and user dependent terminology, is thus described. While the present invention has been described in particular embodiments, it should be appreciated that the present invention should not be construed as limited by such embodiments, but rather construed according to the below claims.

What is claimed is:

1. In a computer system, a method for managing a plurality of modeling entities, said method comprising the steps of:
   a) storing a first version of a revisionable modeling entity in a retrievable storage, said revisionable modeling entity being one of said plurality of modeling entities;
   b) storing a general modeling entity in said retrievable storage, wherein said general modeling entity is one of said plurality of modeling entities and references said revisionable modeling entity wherein said step b) comprises the step of setting an indicator representing a choice of version of said revisionable modeling entity to be selected upon retrieval of said general modeling entity; and
   c) dynamically retrieving said general modeling entity from said retrievable storage, said step c) comprising the steps of:
      c1) examining said indicator to determine said choice of version of said revisionable modeling entity to be selected in conjunction with said general modeling entity;
      c2) selecting a predetermined version of said revisionable modeling entity for said general modeling entity provided that said indicator specifies said predetermined version of said revisionable modeling entity; and
      c3) selecting a designated version of said revisionable modeling entity for said general modeling entity provided that said indicator specifies said designated version of said revisionable modeling entity.

2. The method as recited in claim 1 wherein said retrievable storage is a relational database.

3. The method as recited in claim 1 further comprising the step of storing a second version of said revisionable modeling entity in said retrievable storage.

4. The method as recited in claim 1 wherein said general modeling entity is a second revisionable modeling entity.

5. The method as recited in claim 1 wherein said general modeling entity is a product family.

6. The method as recited in claim 1 wherein said general modeling entity is a workflow step.

7. The method as recited in claim 1 wherein said revisionable modeling entity is a workflow.

8. The method as recited in claim 1 wherein said revisionable modeling entity is a product definition.

9. The method as recited in claim 1 wherein said revisionable modeling entity is a process specification.

10. In a computer system, a method of managing a plurality of modeling entities, said method comprising the steps of:
    a) storing a plurality of versions of a revisionable modeling entity into a computer readable medium, said revisionable modeling entity being one of said plurality of modeling entities;
    b) appointing a first appointed version of said plurality of versions of said revisionable modeling entity as a revision of record for said plurality of versions;
    c) generating a general modeling entity, based in part on user originated information, wherein said general modeling entity is linked to a selected version of said plurality of versions of said revisionable modeling entity to receive information therefrom, said step c) comprising the steps of:
       c1) generating a user interface on said computer system for a user to select said selected version, said user interface comprising:
          a first field for receiving a particular version number, wherein said selected version is said particular version number; and
          a second field for receiving an indicator set or reset, wherein if set, said indicator indicates that said selected version is said revision of record regardless of said first field; and
       c2) storing said general modeling entity in said computer readable medium.

11. The method as recited in claim 10 further comprising the steps of:
    d) appointing a second appointed version of said plurality of versions as said revision of record for said plurality of versions, said second appointed version being different from said first appointed version; and
    e) responsive to step d), automatically linking to said second appointed version, any general modeling entity having selected said revision of record, said step e) being performed without requiring any modification to said any general modeling entity so selected.

12. The method as recited in claim 10 wherein said computer readable medium is managed by a relational database.

13. The method as recited in claim 10 wherein said revisionable modeling entity is a process specification.

14. The method as recited in claim 10 wherein said revisionable modeling entity is a set of work instructions.

15. The method as recited in claim 10 wherein said general modeling entity is a workflow step for describing a step of a manufacturing workflow and wherein said revisionable modeling entity is a process specification having said plurality of versions.

16. A computer system comprising a processor coupled to a bus and a memory unit coupled to said bus, said memory unit having stored therein instructions that when executed implement a method for managing a plurality of modeling entities, said method comprising the steps of:

a) storing a plurality of versions of a revisionable modeling entity into a computer readable medium, said revisionable modeling entity being one of said plurality of modeling entities;

b) appointing a first appointed version of said plurality of versions of said revisionable modeling entity as a revision of record for said plurality of versions;

c) generating a general modeling entity, based in part on user originated information, wherein said general modeling entity is linked to a selected version of said plurality of versions of said revisionable modeling entity to receive information therefrom, said step c) comprising the steps of:

c1) generating a user interface on said computer system for a user to select said selected version, said user interface comprising:

a first field for receiving a particular version number, wherein said selected version is said particular version number; and a second field for receiving an indicator set or reset, wherein if set, said indicator indicates that said selected version is said revision of record regardless of said first field; and c2) storing said general modeling entity in said computer readable medium.

17. The computer system as recited in claim 16 wherein said method further comprises the steps of:

d) appointing a second appointed version of said plurality of versions as said revision of record for said plurality of versions, said second appointed version being different from said first appointed version; and e) responsive to step d), automatically linking to said second appointed version, any general modeling entity having selected said revision of record, said step e) being performed without requiring any modification to said any general modeling entity so selected.

18. The computer system as recited in claim 16 wherein said computer readable medium is managed by a relational database.

19. The computer system as recited in claim 16 wherein said revisionable modeling entity is a process specification.

20. The computer system as recited in claim 16 wherein said revisionable modeling entity is a set of work instructions.

21. The computer system as recited in claim 16 wherein said general modeling entity is a workflow step for describing a step of a manufacturing workflow and wherein said revisionable modeling entity is a process specification having said plurality of versions.

* * * * *